US010684907B2

(12) United States Patent
DelSordo et al.

(10) Patent No.: US 10,684,907 B2
(45) Date of Patent: Jun. 16, 2020

(54) AUTOMATED ERROR DIAGNOSTIC AND REPAIR ANALYSIS

(71) Applicant: ARRIS Enterprises LLC, Suwanee, GA (US)

(72) Inventors: Christopher S. DelSordo, Souderton, PA (US); Albert F. Elcock, West Chester, PA (US); Charles Hardt, Lawrenceville, GA (US)

(73) Assignee: ARRIS ENTERPRISES LLC, Suwanee, GA (US)

( * ) Notice: Subject to any disclaimer, the term of this patent is extended or adjusted under 35 U.S.C. 154(b) by 182 days.

(21) Appl. No.: 15/801,636

(22) Filed: Nov. 2, 2017

(65) Prior Publication Data

US 2019/0129780 A1  May 2, 2019

(51) Int. Cl.
| | | |
|---|---|---|
| *G06F 11/00* | (2006.01) | |
| *G06F 11/07* | (2006.01) | |
| *G06F 16/27* | (2019.01) | |
| *G06Q 10/00* | (2012.01) | |
| *G06Q 10/10* | (2012.01) | |

(52) U.S. Cl.
CPC ........ *G06F 11/079* (2013.01); *G06F 11/0709* (2013.01); *G06F 11/0769* (2013.01); *G06F 11/0793* (2013.01); *G06F 16/27* (2019.01); *G06Q 10/1095* (2013.01); *G06Q 10/20* (2013.01)

(58) Field of Classification Search
CPC .............. G06F 11/079; G06F 11/0793; G06F 11/0709; G06F 11/0769
See application file for complete search history.

(56) References Cited

U.S. PATENT DOCUMENTS

| | | | | |
|---|---|---|---|---|
| 6,782,345 | B1 * | 8/2004 | Siegel | G06F 11/0733 399/18 |
| 7,080,141 | B1 * | 7/2006 | Baekelmans | G06F 11/0709 709/202 |
| 8,543,562 | B2 * | 9/2013 | Mule | G06F 16/434 707/706 |
| 9,459,976 | B1 * | 10/2016 | Sun | G06F 11/00 |
| 2011/0072312 | A1 * | 3/2011 | Fan | G06F 11/0748 714/46 |

(Continued)

*Primary Examiner* — Michael Maskulinski
(74) *Attorney, Agent, or Firm* — Wenderoth, Lind & Ponack, L.L.P.

(57) ABSTRACT

Methods, systems, and computer readable media can be operable to facilitate automated repair analysis for client devices within a subscriber premise. A diagnostics controller may detect an error condition at a network element within a subscriber premise. When an error condition is detected, the diagnostics controller may retrieve identification information, an error code, and/or query parameters associated with the network element. The diagnostics controller may generate a query for repair analysis that includes the identification information, error code, and/or query parameters, and the diagnostics controller may output the query to an upstream server. In response, the diagnostics controller may receive a repair analysis that includes information associated with remedying the error condition. The diagnostics controller may generate and output for presentation a user interface that includes the information associated with remedying the error condition.

20 Claims, 7 Drawing Sheets

(56) References Cited

U.S. PATENT DOCUMENTS

| | | | |
|---|---|---|---|
| 2012/0150632 A1* | 6/2012 | Fan | G06Q 30/016 |
| | | | 705/14.49 |
| 2013/0151893 A1* | 6/2013 | Gorecha | G06F 11/0736 |
| | | | 714/15 |
| 2016/0073159 A1* | 3/2016 | Chidambaram | H04N 21/6581 |
| | | | 725/132 |
| 2017/0269988 A1* | 9/2017 | Alfaro Bergueiro | |
| | | | G06F 11/0793 |

* cited by examiner

AUTOMATED ERROR DIAGNOSTIC AND REPAIR ANALYSIS

TECHNICAL FIELD

This disclosure relates to automated error diagnostics and repair analysis for devices connected to a home network.

BACKGROUND

Typically, multiple services (e.g., video, voice, data, etc.) are received at a subscriber premise by a customer premise equipment (CPE) device (e.g., gateway device), and the multiple services are provided to consumers over a local network (e.g., local area network (LAN), wireless local area network (WLAN), multimedia over coax alliance (MoCA) network, etc.). Devices connected to the local network may be configured to receive services offered by a service provider (e.g., multiple systems operator (MSO)) and may be configured to communicate with other devices connected to the local network.

The types of devices that may be connected to a local network continues to grow in number. For example, local network access is not limited to only multimedia devices (e.g., set-top boxes (STB), televisions, mobile devices, tablets, etc.), but is now available to a multitude of other home and personal devices (e.g., Internet of things (IoT) devices) such as appliances, wearables, automobiles, home automation devices, and others. Devices within a subscriber premise may interconnect using various networking technologies such as Bluetooth, Zigbee, UPnP (universal plug and play), and others.

Typically, when a device within a subscriber premise encounters a problem or experiences an error condition, the device may be configured to display or output an error code which may be used to identify the type of problem or error condition. However, most consumers are unable to easily identify a type of problem or error condition based upon an error code. Further, many consumers may not even be aware that a device within the premise has experienced a problem or error condition. Therefore, it is desirable to provide methods and systems for providing a user with repair analysis information associated with an error condition occurring at a network element within a subscriber premise.

BRIEF DESCRIPTION OF THE DRAWINGS

Like reference numbers and designations in the various drawings indicate like elements.

DETAILED DESCRIPTION

It is desirable to improve upon methods and systems for providing a user with repair analysis information associated with an error condition occurring at a network element within a subscriber premise. Methods, systems, and computer readable media can be operable to facilitate automated repair analysis for client devices within a subscriber premise. A diagnostics controller may detect an error condition at a network element within a subscriber premise. When an error condition is detected, the diagnostics controller may retrieve identification information, an error code, and/or query parameters associated with the network element. The diagnostics controller may generate a query for repair analysis that includes the identification information, error code, and/or query parameters, and the diagnostics controller may output the query to an upstream server. In response, the diagnostics controller may receive a repair analysis that includes information associated with remedying the error condition. The diagnostics controller may generate and output for presentation a user interface that includes the information associated with remedying the error condition.

Figure 1:
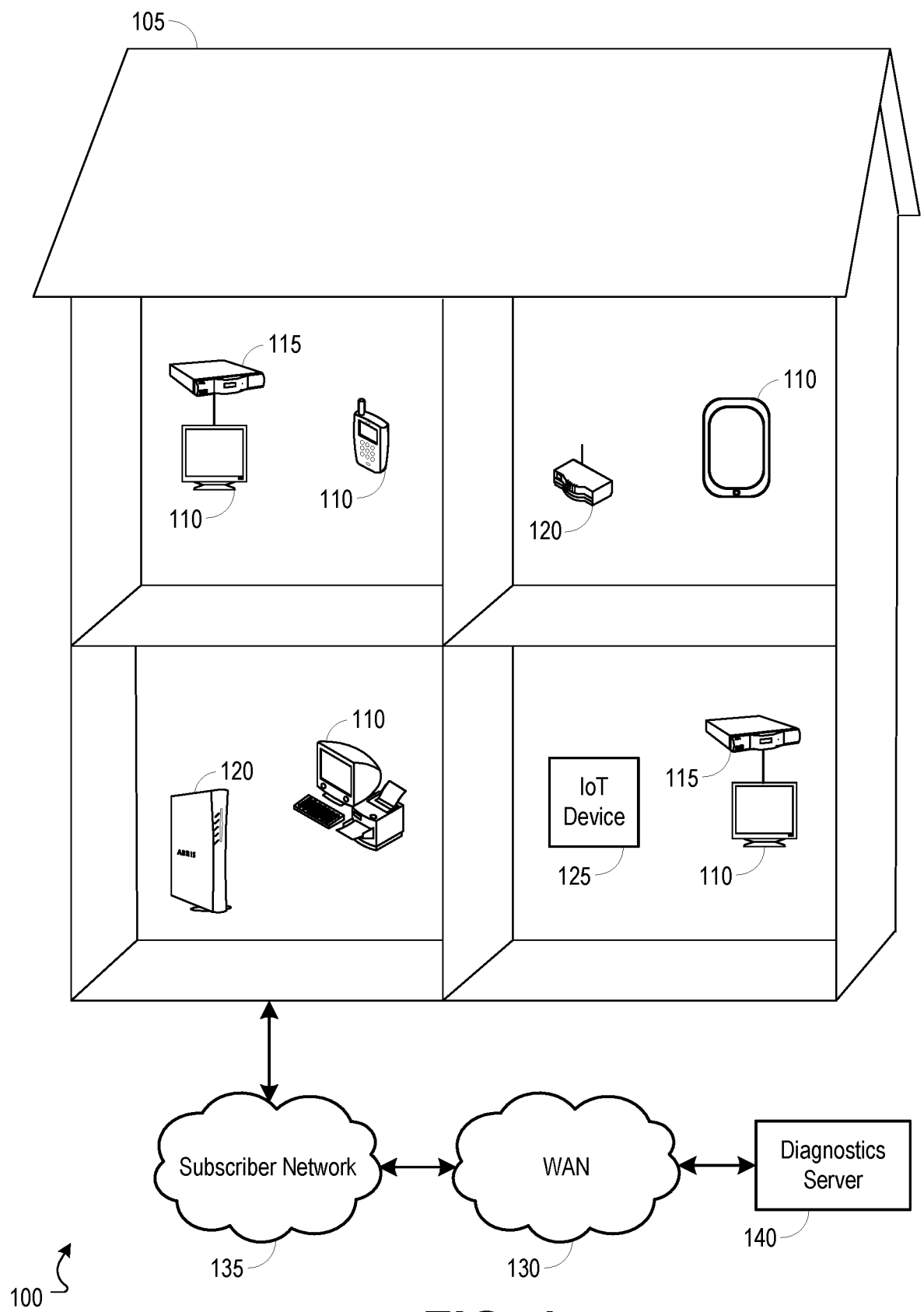
FIG. 1 is a block diagram illustrating an example network environment operable to facilitate automated repair analysis for client devices within a subscriber premise.

FIG. 1 is a block diagram illustrating an example network environment 100 operable to facilitate automated repair analysis for client devices within a subscriber premise. In embodiments, video, voice, and/or data services may be delivered to one or more network elements of a subscriber premise 105. Network elements may include client devices 110 such as televisions, mobile wireless devices (e.g., mobile telephone, tablet, etc.), computers, gaming consoles, wearable devices (e.g., smart watch, glasses, etc.), customer premise equipment (CPE) devices (e.g., set-top box (STB) 115, etc.), access devices 120 (e.g., gateway devices, wireless routers, wireless network extenders, and/or any device configured to receive and/or deliver communications or services to one or more network elements), Internet of Things (IoT) devices 125 (e.g., appliances, security equipment, lights, doors, windows, automobile systems having wireless capability, and various other devices and sensors configured to communicate over a local-area network or via a near field communication (NFC)), and any other device operable to receive video, voice, and/or data services. It should be understood that various data, multimedia, and/or voice services may be delivered to the various network elements within the subscriber premise 105, including but not limited to, live or broadcast television, video-on-demand (VoD) content, pay-per view content, recorded content (e.g., DVR content), audio-only content, streaming content, and others. One or more local networks and wired and/or wireless communication techniques may be utilized to pass communications between the network elements of the subscriber premise 105.

Communications may be passed to and from network elements within the subscriber premise 105 over one or more local networks (e.g., coaxial network, a local area network (LAN), wireless local area network (WLAN), personal area network (PAN), Multimedia over Coax Alliance (MoCA) network, mobile hotspot network, and any other interconnectivity operable to route communications to and from the network elements), and delivery of the communications may be facilitated by one or more access points 120 and/or one or more wireless communication techniques (e.g., NFC, Bluetooth, Zigbee, etc.). It should be understood that one or more access points 120 may be integrated with each other or with other network elements, and that various network elements may operate as a station or an access point.

It should be understood that delivery of communications to and from the network elements of the subscriber premise 105 may be accomplished using a variety of standards and formats. It will be appreciated by those skilled in the relevant art that the network elements may be capable of interacting and communicating with each other over various wired and wireless communication standards (e.g., Wi-Fi, NFC, Bluetooth, Zigbee, etc.).

Multiple services may be provided to a subscriber premise 105 from a WAN 130 through a subscriber network 135. The subscriber network 135 may include, for example, a hybrid fiber-coaxial (HFC) network, fiber network, mobile network, and any other network operable to deliver services to a subscriber premise 105.

In embodiments, a network element may communicate with another network element by utilizing a plurality of network types. For example, an access device 120 may be connected to one or more STBs (e.g., Internet protocol (IP) STBs) via a LAN, and the one or more STBs may be connected to one or more other devices via a NFC interface (e.g., Bluetooth, Zigbee, etc.). In this example, communications may be passed between the one or more other devices and the one or more STBs over the NFC interface, and communications may be forwarded to the access device 120 or output from the access device 120 to/from the one or more STBs over the LAN. For example, an automobile that is parked in the garage of a subscriber premise 105 may be near enough in proximity to a STB to communicate with the STB via a NFC interface, and through the NFC interface, the STB may receive a notification of an error condition existing at the automobile and may receive diagnostic information associated with the error condition.

In embodiments, STBs may be located at different locations within the subscriber premise 105, and each STB may pair with one or more nearby devices (e.g., devices within range of a NFC interface associated with the STB) having a NFC capability. One or more of the STBs may be connected directly to a subscriber network 135 (i.e., a STB may be successfully connected to the Internet) and may output a query for a repair analysis to an upstream server (e.g., diagnostics server 140). One or more of the STBs may send information associated with an error condition to an access device 120, and the access device 120 may output a query for a repair analysis to an upstream server (e.g., diagnostics server 140).

In embodiments, when an error or malfunction occurs at a network element, the network element may output a wireless communication indicating the occurrence of the error or malfunction. The communication may be received by a diagnostics controller. A diagnostics controller may be any network element that provides an automated repair analysis capability. For example, a client device 110, a STB 115 or multimedia gateway, or an access device 120 may be configured to detect an error condition at a network element (e.g., by receiving and identifying the wireless communication indicating the occurrence of the error or malfunction) and to retrieve information associated with the error condition.

During runtime operation, a diagnostics controller (e.g., STB 115, access device 120, etc.) may retrieve a status of each network element with which the diagnostics controller is paired through a NFC interface. Once paired with a network element, a diagnostics controller may determine whether the network element supports an automated repair analysis feature. For example, a customized HTTP (hypertext transfer protocol) RESTful (representational state transfer) protocol may be used to pass status information from a network element to a diagnostics controller.

In embodiments, when a diagnostics controller detects an error condition at a device (i.e., at another network element), the diagnostics controller may retrieve identification information associated with the device (e.g., device name, model identification, serial number, etc.) and a diagnostic error identifier (e.g., an error code) associated with the error condition. For example, the device at which the error condition occurs may output a unique identifier associated with the type of error that has occurred at the device.

Using the identification information associated with the device and the diagnostic error identifier, the diagnostics controller may generate a query for repair analysis. The query for repair analysis may include the identification information associated with the device and the diagnostic error identifier, and the query may further include a request for specified information associated with remedying the error condition at the device. For example, the query may include a request for troubleshooting information associated with the error condition, information associated with purchasing parts or services for remedying the error condition (e.g., cost of parts or services, locations for purchasing parts or services, websites for purchasing parts or services, etc.), information associated with repair shops that may provide a service for remedying the error condition (e.g., location of repair shops, operating hours of repair shops, contact information for repair shops, etc.), and others.

In embodiments, the diagnostics controller may output the query for repair analysis to an upstream server (e.g., diagnostics server 140). The diagnostics server 140 may be a MSO (multiple-systems operator) server that stores repair analysis information associated with network elements, or the diagnostics server 140 may be a server controlled by one or more entities offering troubleshooting or repair information for network elements. In embodiments, the query for repair analysis may be a query within an Internet search engine. For example, the diagnostics controller may initiate a query within an Internet search engine, wherein the query includes the identification information associated with the device and the diagnostic error identifier.

In embodiments, the upstream server (e.g., diagnostics server 140) may be located within, or otherwise locally connected to a LAN of the subscriber premise 105. For example, the upstream server may be an MSO server that is placed on-site at a business/commercial location or a MDU (multiple dwelling unit).

In embodiments, a diagnostics controller may be configured with one or more repair analysis query parameters for one or more network elements within the subscriber premise 105. For example, repair analysis query parameters for a network element may include an identification of specific information to be requested in the event of an error condition occurring at the network element, an identification of one or more servers to be queried in the event of an error condition occurring at the network element, an identification of one or more repair shops or retail sources to be contacted or searched for parts or services needed to remedy an error condition occurring at the network element, one or more actions to be taken in response to an error condition occurring at the network element (e.g., automatically ordering a part or service associated with the error condition), and other parameters.

In embodiments, a diagnostics controller may receive repair analysis information from an upstream server (e.g., diagnostics server 140). The repair analysis information may be sent to the diagnostics controller in response to the query for repair analysis. The repair analysis information may include information associated with the error condition detected by the diagnostics controller. If the query for repair analysis included a request for specific information associated with the error condition, the repair analysis information may include the requested information.

Using the received repair analysis information, the diagnostics controller may generate a user interface that includes the received repair analysis information, and the diagnostics controller may output the user interface for presentation at a display. For example, the user interface may be output for presentation at a television screen, a mobile device, or other display screen. In embodiments, the diagnostics controller may output an alert or notification to a display (e.g., television, mobile device, etc.) that serves to indicate to a user that repair analysis information associated with an error condition at a network element is available. In embodiments, the user interface may provide a user with an option to initiate an action to be taken in response to the error condition. For example, the user interface may display one or more selectable actions that may be taken in response to the error condition (e.g., retrieve troubleshooting information, purchase a part or service, schedule a service appointment, etc.), and the diagnostics controller may initiate an action in response to a user selection of the corresponding action within the user interface. In embodiments, the user interface may include one or more links to troubleshooting documents (e.g., how-to guides, instruction manuals, etc.) or troubleshooting videos (e.g., video showing a user how to repair or fix the experienced error condition) that are associated with an error condition detected at a network element.

In embodiments, the diagnostics controller may be configured to automatically carry out one or more actions in response to detecting a certain error condition at a network element. As an example, the diagnostics controller may be configured to automatically (i.e., without receiving a user command/instruction) initiate a purchase of a part or service or schedule an appointment for repair or service when a predetermined error condition is detected at a certain network element. In scheduling an appointment for repair or service, the diagnostics controller may access a user calendar to determine the availability of the user.

Figure 2:
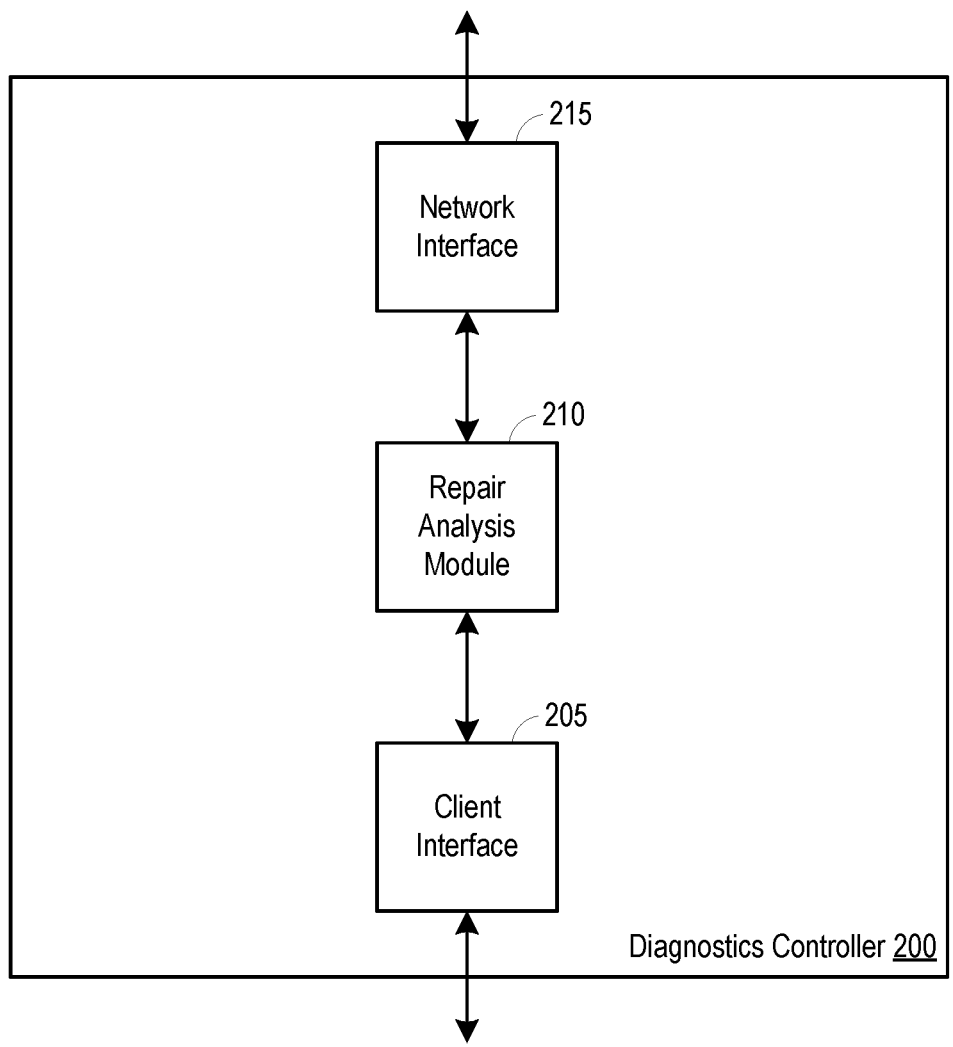
FIG. 2 is a block diagram illustrating an example diagnostics controller operable to facilitate automated repair analysis for client devices within a subscriber premise.

FIG. 2 is a block diagram illustrating an example diagnostics controller 200 operable to facilitate automated repair analysis for client devices within a subscriber premise. The diagnostics controller 200 may be any network element that provides an automated repair analysis capability. For example, the diagnostics controller 200 may be a STB 115 of FIG. 1, multimedia gateway, access device 120 of FIG. 1, or any other device configured to provide an automated repair analysis capability. The diagnostics controller 200 may include a client interface 205, a repair analysis module 210, and a network interface 215.

In embodiments, when an error or malfunction occurs at a network element (e.g., client device 110 of FIG. 1, STB 115 of FIG. 1, access device 120 of FIG. 1, IoT device 125 of FIG. 1, or other device configured to communicate over a home network), the network element may output a wireless communication indicating the occurrence of the error or malfunction. The communication may be received by the diagnostics controller 200. For example, the communication may be received through the client interface 205 and may be recognized by the repair analysis module 210. The client interface 205 may include one or more of an interface to a LAN, WLAN, PAN, MoCA network, mobile hotspot network, and/or a NFC interface (e.g., Bluetooth, Zigbee, etc.). The diagnostics controller 200 may communicate with one or more network elements of a subscriber premise (e.g., subscriber premise 105 of FIG. 1) through the client interface 205.

In embodiments, through the client interface 205, the diagnostics controller 200 may be paired with one or more network elements. Once paired with a network element, the repair analysis module 210 may determine whether the network element supports an automated repair analysis feature. For example, a customized HTTP RESTful protocol may be used to pass status information from a network element to the repair analysis module 210.

In embodiments, when the repair analysis module 210 receives a communication that indicates the occurrence of an error condition at a network element, the repair analysis module 210 may initiate a retrieval of identification information associated with the network element (e.g., device name, model identification, serial number, etc.) and a diagnostic error identifier (e.g., an error code) associated with the error condition. In embodiments, the repair analysis module 210 may output a request for a unique identifier associated with the type of error that has occurred at the network element. In other embodiments, the communication indicating the occurrence of an error condition at a network element may include identification information associated with the network element and a diagnostic error identifier, and the repair analysis module 210 may retrieve the identification information and the diagnostic error identifier from the communication.

Using retrieved identification information and diagnostic error identifier, the repair analysis module 210 may generate a query for repair analysis. The query for repair analysis may include the identification information associated with the network element experiencing an error condition and the diagnostic error identifier, and the query may further include a request for specified information associated with remedying the error condition at the network element. For example, the query may include a request for troubleshooting information associated with the error condition, information associated with purchasing parts or services for remedying the error condition (e.g., cost of parts or services, locations for purchasing parts or services, websites for purchasing parts or services, etc.), information associated with repair shops that may provide a service for remedying the error condition (e.g., location of repair shops, operating hours of repair shops, contact information for repair shops, etc.), and others.

In embodiments, the repair analysis module 210 may output the query for repair analysis to an upstream server (e.g., diagnostics server 140 of FIG. 1). The repair analysis module 210 may output the query through the network interface 215. The network interface may include an interface to a network (e.g., subscriber network 135 of FIG. 1, WAN 130 of FIG. 1, etc.) or may include an interface with a device that supports a connection with an upstream network (e.g., an access device 120). The upstream server may be a MSO server that stores repair analysis information associated with network elements or a server controlled by one or more entities offering troubleshooting or repair information for network elements. In embodiments, the query for repair analysis may be a query within an Internet search engine. For example, the repair analysis module 210 may initiate a query within an Internet search engine, wherein the query includes the identification information associated with the device and the diagnostic error identifier.

In embodiments, the upstream server (e.g., diagnostics server 140) may be located within, or otherwise locally connected to, a LAN of the subscriber premise 105. For example, the upstream server may be an MSO server that is placed on-site at a business/commercial location or a MDU (multiple dwelling unit).

In embodiments, the repair analysis module 210 may be configured with one or more repair analysis query parameters for one or more network elements within a subscriber premise. For example, repair analysis query parameters for a network element may include an identification of specific information to be requested in the event of an error condition occurring at the network element, an identification of one or more servers to be queried in the event of an error condition occurring at the network element, an identification of one or more repair shops or retail sources to be contacted or searched for parts or services needed to remedy an error condition occurring at the network element, one or more actions to be taken in response to an error condition occurring at the network element (e.g., automatically ordering a part or service associated with the error condition), and other parameters.

In response to the query for repair analysis being received at the upstream server, the repair analysis module 210 may receive repair analysis information from the upstream server. The repair analysis information may include information associated with the error condition detected by the repair analysis module 210. If the query for repair analysis included a request for specific information associated with the error condition, the repair analysis information may include the requested information.

Using the received repair analysis information, the repair analysis module 210 may generate a user interface that includes the received repair analysis information, and the repair analysis module 210 may output the user interface for presentation at a display. For example, the user interface may be output through the client interface 205 for presentation at a television screen, a mobile device, or other display screen. The repair analysis information may include costs for a part or service from a plurality of retailers or shops, and the user interface may show the costs, thereby allowing a user to compare costs from the various retailers or shops.

In embodiments, the repair analysis module 210 may output an alert or notification to a display (e.g., television, mobile device, etc.) that serves to indicate to a user that repair analysis information associated with an error condition at a network element is available. In embodiments, the user interface may provide a user with an option to initiate an action to be taken in response to the error condition. For example, the user interface may display one or more selectable actions that may be taken in response to the error condition (e.g., retrieve troubleshooting information, purchase a part or service, schedule a service appointment, etc.), and the repair analysis module 210 may initiate an action in response to a user selection of the corresponding action within the user interface. In embodiments, the user interface may include one or more links to troubleshooting documents (e.g., how-to guides, instruction manuals, etc.) or troubleshooting videos (e.g., video showing a user how to repair or fix the experienced error condition) that are associated with an error condition detected at a network element.

In embodiments, the repair analysis module 210 may be configured to automatically carry out one or more actions in response to detecting a certain error condition at a network element. As an example, the repair analysis module 210 may be configured to automatically (i.e., without receiving a user command/instruction) initiate a purchase of a part or service or schedule an appointment for repair or service when a predetermined error condition is detected at a certain network element. In scheduling an appointment for repair or service, the repair analysis module 210 may access a user calendar to determine the availability of the user.

Figure 3:
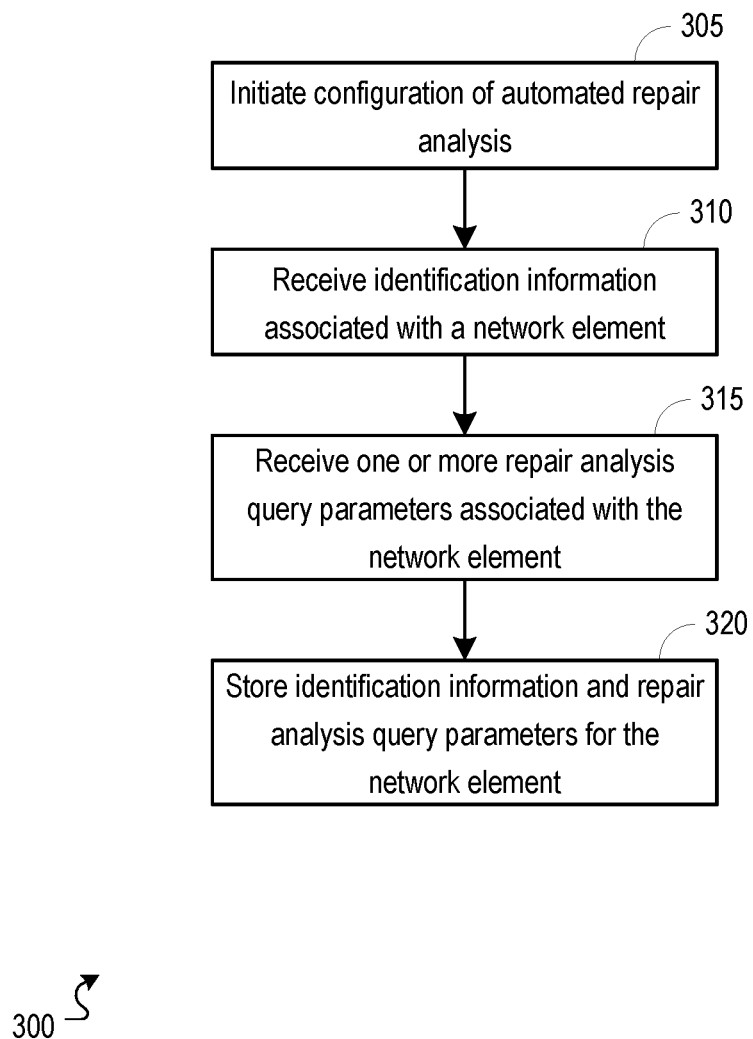
FIG. 3 is a flowchart illustrating an example process operable to configure an automated repair analysis feature at a network element.

FIG. 3 is a flowchart illustrating an example process 300 operable to configure an automated repair analysis feature at a network element. The process 300 can begin at 305, when configuration of an automated repair analysis feature is initiated. In embodiments, configuration of the automated repair analysis feature may be initiated at a network element within a subscriber premise. The network element may be a diagnostics controller 200 of FIG. 2 (e.g., a STB 115 of FIG. 1, access device 120 of FIG. 1, or any other device having an automated repair analysis feature).

At 310, identification information associated with a network element may be received. The identification information may be received, for example, by the diagnostics controller 200 (e.g., by a repair analysis module 210 of FIG. 2). In embodiments, the identification information may be input by a user. In other embodiments, the identification information may be retrieved from the corresponding network element. For example, the identification information may be passed to the diagnostics controller 200 during a process of pairing the diagnostics controller 200 with the network element. The identification information may include unique identifiers (e.g., device name, serial number, etc.) or device-type identifiers (e.g., model name, model number, etc.).

At 315, one or more repair analysis query parameters associated with the network element may be received. The one or more repair analysis query parameters may be received, for example, by the diagnostics controller 200 (e.g., by a repair analysis module 210). In embodiments, the one or more repair analysis query parameters to be associated with the network element may be input by a user. The one or more repair analysis query parameters may include an identification of specific information to be requested in the event of an error condition occurring at the network element, an identification of one or more servers to be queried in the event of an error condition occurring at the network element, an identification of one or more repair shops or retail sources to be contacted or searched for parts or services needed to remedy an error condition occurring at the network element, one or more actions to be taken in response to an error condition occurring at the network element (e.g., automatically ordering a part or service associated with the error condition), and other parameters.

At 320, the identification information associated with the network element and the one or more repair analysis query parameters associated with the network element may be stored. The identification information and repair analysis query parameters may be stored, for example, at the diagnostics controller 200 (e.g., at a repair analysis module 210). In embodiments, the identification information and repair analysis query parameters may be stored at the diagnostics controller 200 for utilization in the event that an error condition is detected at the network element.

Figure 4:
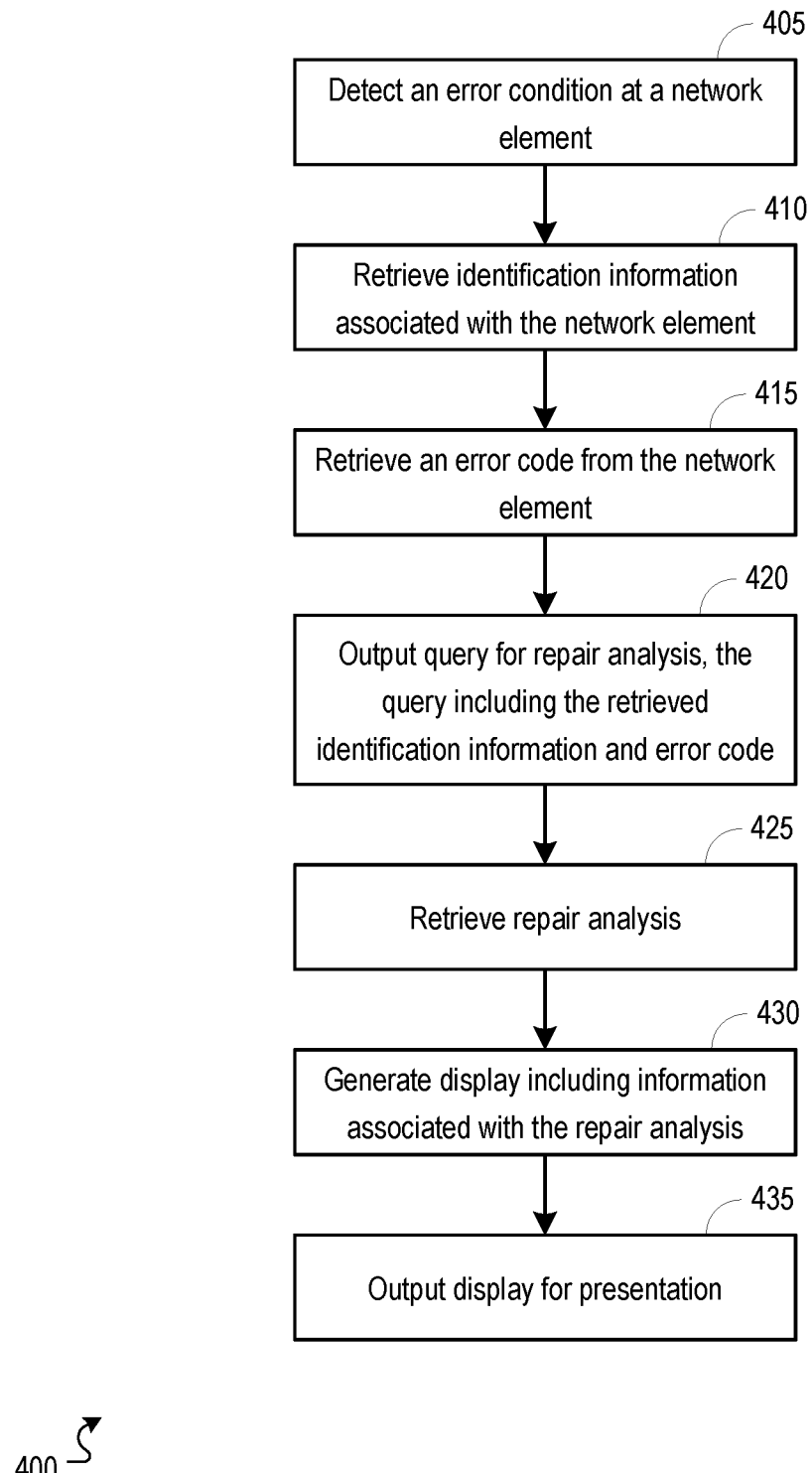
FIG. 4 is a flowchart illustrating an example process, whereby repair analysis information is retrieved in response to a detection of an error condition at a network element and a retrieval of an error code from the network element.

FIG. 4 is a flowchart illustrating an example process 400, whereby repair analysis information is retrieved in response to a detection of an error condition at a network element and a retrieval of an error code from the network element. The process 400 can begin at 405, when an error condition occurring at a network element is detected. The error condition may be detected, for example, by a diagnostics controller 200 of FIG. 2 (e.g., a STB 115 of FIG. 1, access device 120 of FIG. 1, or any other device having an automated repair analysis feature). In embodiments, when an error condition occurs at a network element (e.g., client device 110 of FIG. 1, STB 115, access device 120, IoT device 125 of FIG. 1, etc.), the network element may output a communication (e.g., wireless signal) that includes an indication of the error condition, and the communication may be received and recognized by a diagnostics controller 200 (e.g., by a repair analysis module 210 of FIG. 2).

At 410, identification information associated with the network element may be retrieved. Identification information associated with the network element may be retrieved, for example, by the diagnostics controller 200 (e.g., by the repair analysis module 210). Identification information associated with the network element may include information such as device name, model identification, serial number, and others. In embodiments, the repair analysis module 210 may retrieve identification information associated with the network element from the communication that includes the indication of the error condition. In other embodiments, the repair analysis module 210 may output a request for identification information associated with the network element, and the repair analysis module 210 may retrieve the identification information from a communication received from the network element in response to the request.

At 415, an error code may be retrieved from the network element. The error code may be retrieved, for example, by the diagnostics controller 200 (e.g., by the repair analysis module 210). The error code (i.e., diagnostic error identifier) may be a unique identifier associated with the type of error that has occurred at the network element. In embodiments, the repair analysis module 210 may output a request for a unique identifier associated with the type of error that has occurred at the network element, and an error code may be retrieved from a communication received from the network element in response to the request. In other embodiments, the communication that includes the indication of the error condition may include an error code, and the repair analysis module 210 may retrieve the error code from the communication.

At 420, a query for repair analysis may be generated and output, the query including the retrieved identification information and error code. The query for repair analysis may be generated and output, for example, by the diagnostics controller 200 (e.g., by the repair analysis module 210). Using the retrieved identification information and error code, the repair analysis module 210 may generate a query for repair analysis. The query for repair analysis may include the identification information associated with the network element experiencing an error condition and the error code associated with the error condition, and the query may further include a request for specified information associated with remedying the error condition at the network element. For example, the query may include a request for troubleshooting information associated with the error condition, information associated with purchasing parts or services for remedying the error condition (e.g., cost of parts or services, locations for purchasing parts or services, websites for purchasing parts or services, etc.), information associated with repair shops that may provide a service for remedying the error condition (e.g., location of repair shops, operating hours of repair shops, contact information for repair shops, etc.), and others. In embodiments, the repair analysis module 210 may output the query for repair analysis to an upstream server (e.g., diagnostics server 140 of FIG. 1). In embodiments, the query for repair analysis may be a query within an Internet search engine. For example, the repair analysis module 210 may initiate a query within an Internet search engine, wherein the query includes the identification information associated with the device and the error code associated with the error condition.

At 425, a repair analysis may be retrieved. The repair analysis may be retrieved, for example, by the diagnostics controller 200 (e.g., by the repair analysis module 210). The repair analysis may be retrieved by the repair analysis module 210 from an upstream server (e.g., diagnostics server 140). The repair analysis may include information associated with the error condition detected by the repair analysis module 210. If the query for repair analysis included a request for specific information associated with the error condition, the repair analysis information may include the requested information. For example, the repair analysis may include troubleshooting information associated with the error condition (e.g., links to a troubleshooting guide or troubleshooting video), information associated with purchasing parts or services for remedying the error condition (e.g., cost of parts or services, locations for purchasing parts or services, websites for purchasing parts or services, etc.), information associated with repair shops that may provide a service for remedying the error condition (e.g., location of repair shops, operating hours of repair shops, contact information for repair shops, etc.), and others.

At 430, a display including information associated with the repair analysis may be generated. The display may be generated, for example, by the diagnostics controller 200 (e.g., by the repair analysis module 210). In embodiments, the display may be a user interface that includes a presentation of information retrieved from the repair analysis. It should be understood that the information retrieved from the repair analysis may be presented within a display utilizing various formats and/or layouts.

At 435, the display may be output for presentation. For example, the repair analysis module 210 may output the user interface (i.e., display) for presentation at a display (e.g., a television screen, a mobile device, or other display screen).

Figure 5:
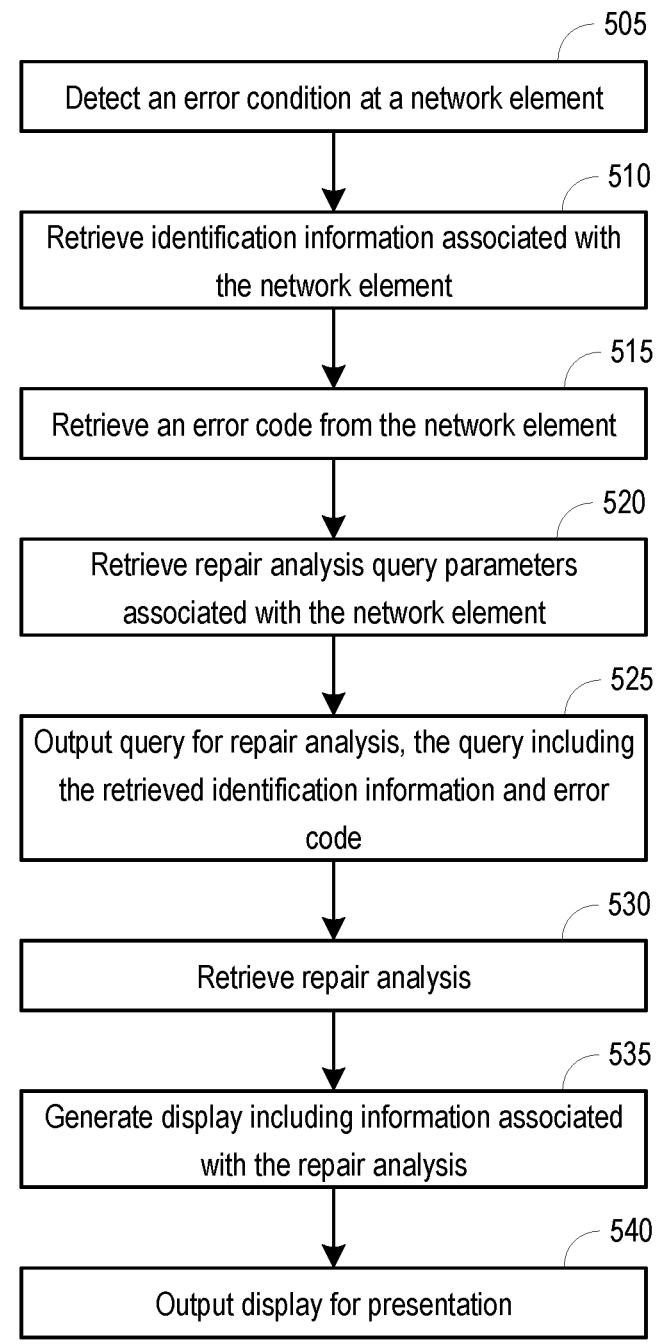
FIG. 5 is a flowchart illustrating an example process, whereby repair analysis information specified through one or more query parameters is retrieved in response to a detection of an error condition at a network element and a retrieval of an error code from the network element.

FIG. 5 is a flowchart illustrating an example process 500, whereby repair analysis information specified through one or more query parameters is retrieved in response to a detection of an error condition at a network element and a retrieval of an error code from the network element. The process 500 can begin at 505, when an error condition occurring at a network element is detected. The error condition may be detected, for example, by a diagnostics controller 200 of FIG. 2 (e.g., a STB 115 of FIG. 1, access device 120 of FIG. 1, or any other device having an automated repair analysis feature). In embodiments, when an error condition occurs at a network element (e.g., client device 110 of FIG. 1, STB 115, access device 120, IoT device 125 of FIG. 1, etc.), the network element may output a communication (e.g., wireless signal) that includes an indication of the error condition, and the communication may be received and recognized by a diagnostics controller 200 (e.g., by a repair analysis module 210 of FIG. 2).

At 510, identification information associated with the network element may be retrieved. Identification information associated with the network element may be retrieved, for example, by the diagnostics controller 200 (e.g., by the repair analysis module 210). Identification information associated with the network element may include information such as device name, model identification, serial number, and others. In embodiments, the repair analysis module 210 may retrieve identification information associated with the network element from the communication that includes the indication of the error condition. In other embodiments, the repair analysis module 210 may output a request for identification information associated with the network element, and the repair analysis module 210 may retrieve the identification information from a communication received from the network element in response to the request.

At 515, an error code may be retrieved from the network element. The error code may be retrieved, for example, by the diagnostics controller 200 (e.g., by the repair analysis module 210). The error code (i.e., diagnostic error identifier) may be a unique identifier associated with the type of error that has occurred at the network element. In embodiments, the repair analysis module 210 may output a request for a unique identifier associated with the type of error that has occurred at the network element, and an error code may be retrieved from a communication received from the network element in response to the request. In other embodiments, the communication that includes the indication of the error condition may include an error code, and the repair analysis module 210 may retrieve the error code from the communication.

At 520, one or more repair analysis query parameters associated with the network element may be retrieved. The one or more repair analysis query parameters may be retrieved, for example, by the diagnostics controller 200 (e.g., by the repair analysis module 210). In embodiments, the repair analysis module 210 may be configured with one or more repair analysis query parameters for one or more network elements within a subscriber premise. Repair analysis query parameters for a network element may include an identification of specific information to be requested in the event of an error condition occurring at the network element, an identification of one or more servers to be queried in the event of an error condition occurring at the network element, an identification of one or more repair shops or retail sources to be contacted or searched for parts or services needed to remedy an error condition occurring at the network element, one or more actions to be taken in response to an error condition occurring at the network element (e.g., automatically ordering a part or service associated with the error condition), and other parameters.

At 525, a query for repair analysis may be generated and output, the query including the retrieved identification information and error code. The query for repair analysis may be generated and output, for example, by the diagnostics controller 200 (e.g., by the repair analysis module 210). Using the retrieved identification information and error code, the repair analysis module 210 may generate a query for repair analysis. The query for repair analysis may include the identification information associated with the network element experiencing an error condition and the error code associated with the error condition, and the query may further include a request for information specified by the repair analysis query parameters associated with the network element. For example, the query may include a request for troubleshooting information associated with the error condition, information associated with purchasing parts or services for remedying the error condition (e.g., cost of parts or services, locations for purchasing parts or services, websites for purchasing parts or services, etc.), information associated with repair shops that may provide a service for remedying the error condition (e.g., location of repair shops, operating hours of repair shops, contact information for repair shops, etc.), and others. In embodiments, the repair analysis module 210 may output the query for repair analysis to an upstream server (e.g., diagnostics server 140 of FIG. 1). In embodiments, the query for repair analysis may be a query within an Internet search engine. For example, the repair analysis module 210 may initiate a query within an Internet search engine, wherein the query includes the identification information associated with the device and the error code associated with the error condition.

At 530, a repair analysis may be retrieved. The repair analysis may be retrieved, for example, by the diagnostics controller 200 (e.g., by the repair analysis module 210). The repair analysis may be retrieved by the repair analysis module 210 from an upstream server (e.g., diagnostics server 140). The repair analysis may include information associated with the error condition detected by the repair analysis module 210. If the query for repair analysis included a request for specific information associated with the error condition, the repair analysis information may include the requested information. For example, the repair analysis may include troubleshooting information associated with the error condition, information associated with purchasing parts or services for remedying the error condition (e.g., cost of parts or services, locations for purchasing parts or services, websites for purchasing parts or services, etc.), information associated with repair shops that may provide a service for remedying the error condition (e.g., location of repair shops, operating hours of repair shops, contact information for repair shops, etc.), and others.

At 535, a display including information associated with the repair analysis may be generated. The display may be generated, for example, by the diagnostics controller 200 (e.g., by the repair analysis module 210). In embodiments, the display may be a user interface that includes a presentation of information retrieved from the repair analysis. It should be understood that the information retrieved from the repair analysis may be presented within a display utilizing various formats and/or layouts. In embodiments, the display may include one or more links to troubleshooting documents (e.g., how-to guides, instruction manuals, etc.) or troubleshooting videos (e.g., video showing a user how to repair or fix the experienced error condition) that are associated with the detected error condition.

At 540, the display may be output for presentation. For example, the repair analysis module 210 may output the user interface (i.e., display) for presentation at a display (e.g., a television screen, a mobile device, or other display screen).

Figure 6:
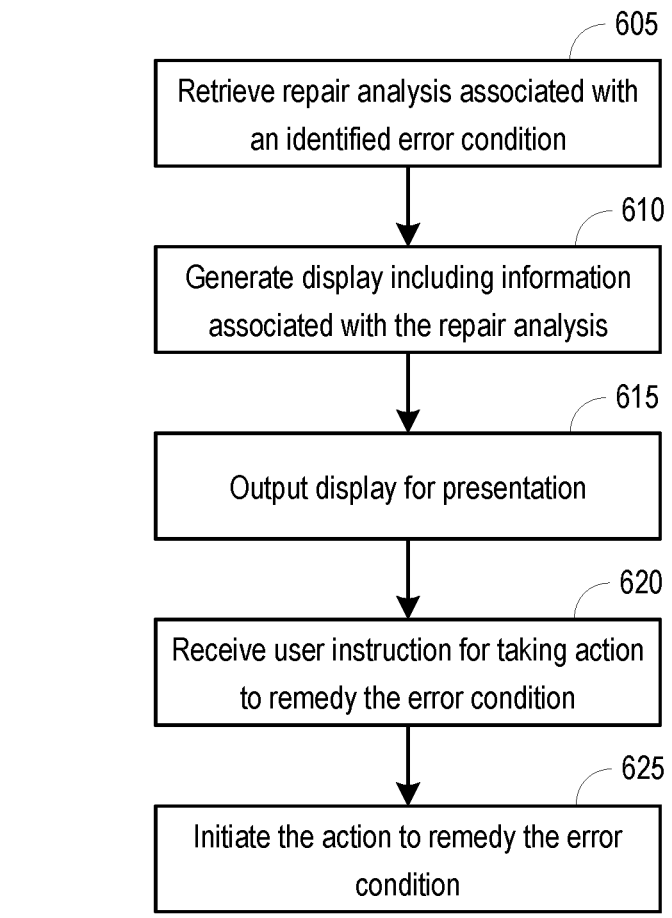
FIG. 6 is a flowchart illustrating an example process, whereby an action is taken for remedying an error condition at a network element in response to a presentation of repair analysis information.

FIG. 6 is a flowchart illustrating an example process 600, whereby an action is taken for remedying an error condition at a network element in response to a presentation of repair analysis information. The process 600 can begin at 605, when a repair analysis associated with an identified error condition is retrieved. The repair analysis may be retrieved, for example, by a diagnostics controller 200 of FIG. 2 (e.g., by the repair analysis module 210 of FIG. 2). The repair analysis may be retrieved by the repair analysis module 210 from an upstream server (e.g., diagnostics server 140). The repair analysis may be requested in response to an identification of an error condition at a network element (e.g., client device 110 of FIG. 1, STB 115, access device 120, IoT device 125 of FIG. 1, etc.), and the repair analysis may include information associated with the error condition detected by the repair analysis module 210. The repair analysis may be retrieved as a response to a query for repair analysis, and the repair analysis may include information requested by the query for repair analysis. For example, the repair analysis may include troubleshooting information associated with the error condition, information associated with purchasing parts or services for remedying the error condition (e.g., cost of parts or services, locations for purchasing parts or services, websites for purchasing parts or services, etc.), information associated with repair shops that may provide a service for remedying the error condition (e.g., location of repair shops, operating hours of repair shops, contact information for repair shops, etc.), and others.

At 610, a display including information associated with the repair analysis may be generated. The display may be generated, for example, by the diagnostics controller 200 (e.g., by the repair analysis module 210). In embodiments, the display may be a user interface that includes a presentation of information retrieved from the repair analysis. The user interface may include one or more options to initiate an action to be taken in response to the error condition. For example, the user interface may display one or more selectable actions that may be taken in response to the error condition (e.g., retrieve troubleshooting information, purchase a part or service, schedule a service appointment, etc.). It should be understood that the information retrieved from the repair analysis may be presented within a display utilizing various formats and/or layouts.

At 615, the display may be output for presentation. For example, the repair analysis module 210 may output the user interface (i.e., display) for presentation at a display (e.g., a television screen, a mobile device, or other display screen). In embodiments, the display may include one or more links to troubleshooting documents (e.g., how-to guides, instruction manuals, etc.) or troubleshooting videos (e.g., video showing a user how to repair or fix the experienced error condition) that are associated with the detected error condition.

At 620, user instruction for taking action to remedy the error condition may be received. The user instruction may be received, for example, by the diagnostics controller 200 (e.g., by the repair analysis module 210). In embodiments, a user may select an option for remedying the error condition (e.g., retrieve troubleshooting information, purchase a part or service, schedule a service appointment, etc.), the option being presented within the user interface that is output to the display, and the repair analysis module 210 may receive a notification of the user selection. In response, the repair analysis module 210 may initiate the selected action for remedying the error condition at 625.

Figure 7:
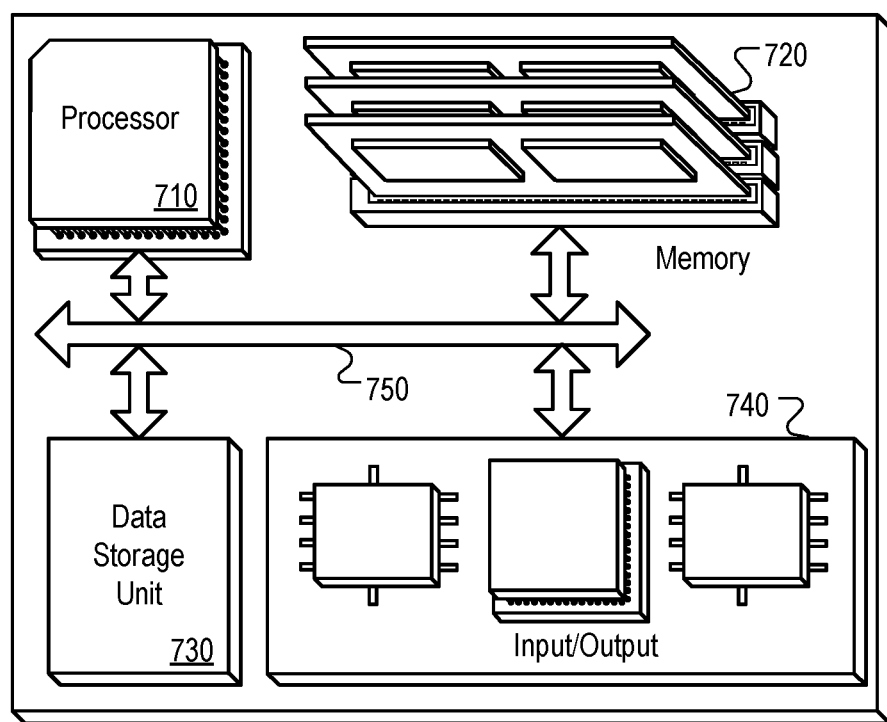
FIG. 7 is a block diagram of a hardware configuration operable to facilitate automated repair analysis for client devices within a subscriber premise.

FIG. 7 is a block diagram of a hardware configuration 700 operable to facilitate automated repair analysis for client devices within a subscriber premise. The hardware configuration 700 can include a processor 710, a memory 720, a storage device 730, and an input/output device 740. Each of the components 710, 720, 730, and 740 can, for example, be interconnected using a system bus 750. The processor 710 can be capable of processing instructions for execution within the hardware configuration 700. In one implementation, the processor 710 can be a single-threaded processor. In another implementation, the processor 710 can be a multi-threaded processor. The processor 710 can be capable of processing instructions stored in the memory 720 or on the storage device 730.

The memory 720 can store information within the hardware configuration 700. In one implementation, the memory 720 can be a computer-readable medium. In one implementation, the memory 720 can be a volatile memory unit. In another implementation, the memory 720 can be a non-volatile memory unit.

In some implementations, the storage device 730 can be capable of providing mass storage for the hardware configuration 700. In one implementation, the storage device 730 can be a computer-readable medium. In various different implementations, the storage device 730 can, for example, include a hard disk device, an optical disk device, flash memory or some other large capacity storage device. In other implementations, the storage device 730 can be a device external to the hardware configuration 700.

The input/output device 740 provides input/output operations for the hardware configuration 700. In embodiments, the input/output device 740 can include one or more of a network interface device (e.g., an Ethernet card), a serial communication device (e.g., an RS-232 port), one or more universal serial bus (USB) interfaces (e.g., a USB 2.0 port), one or more wireless interface devices (e.g., an 802.11 card), and/or one or more interfaces for outputting video and/or data services to a network element (e.g., client device 110 of FIG. 1, STB 115 of FIG. 1, access device 120 of FIG. 1, IoT device 125 of FIG. 1, etc.). In embodiments, the input/output device can include driver devices configured to send communications to, and receive communications from one or more networks (e.g., local network, subscriber network 135 of FIG. 1, WAN 130 of FIG. 1, etc.).

Those skilled in the art will appreciate that the invention improves upon methods and systems for providing a user with repair analysis information associated with an error condition occurring at a network element within a subscriber premise. Methods, systems, and computer readable media can be operable to facilitate automated repair analysis for client devices within a subscriber premise. A diagnostics controller may detect an error condition at a network element within a subscriber premise. When an error condition is detected, the diagnostics controller may retrieve identification information, an error code, and/or query parameters associated with the network element. The diagnostics controller may generate a query for repair analysis that includes the identification information, error code, and/or query parameters, and the diagnostics controller may output the query to an upstream server. In response, the diagnostics controller may receive a repair analysis that includes information associated with remedying the error condition. The diagnostics controller may generate and output for presentation a user interface that includes the information associated with remedying the error condition.

The subject matter of this disclosure, and components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD ROM disks. The processor and the memory can be supplemented by, or incorporated in, special purpose logic circuitry.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

We claim:

1. A method comprising:
   detecting an error condition at a network element, wherein the error condition is detected by a diagnostics controller;
   retrieving identification information associated with the network element;
   retrieving an error code associated with the error condition;
   generating a query, wherein the query comprises a query within an Internet search engine, and wherein the query comprises at least the identification information associated with the network element and the error code associated with the error condition, wherein the query is generated by the diagnostics controller;
   outputting the query from the diagnostics controller to an upstream server;
   retrieving repair analysis information from the upstream server;
   generating a user interface comprising the repair analysis information; and
   outputting the user interface for presentation at a display.

2. The method of claim 1, further comprising:
   receiving a user instruction for taking an action to remedy the error condition; and
   initiating the action identified by the user instruction.

3. The method of claim 1, further comprising:
   retrieving one or more query parameters associated with the network element, wherein the one or more query parameters comprise specific repair analysis information to be retrieved; and
   including a request for the specific repair analysis information in the query.

4. The method of claim 1, wherein the repair analysis information comprises troubleshooting information associated with the error condition.

5. The method of claim 1, wherein the repair analysis information comprises contact information for a repair source associated with the network element.

6. The method of claim 1, wherein the repair analysis information comprises an identification of a repair source associated with the network element.

7. The method of claim 6, further comprising:
   scheduling an appointment for repairing the network element at the repair source.

8. A diagnostics controller comprising:
   a repair analysis module that:
   detects an error condition at a network element;
   retrieves identification information associated with the network element;
   retrieves an error code associated with the error condition; and
   generates a query, wherein the query comprises a query within an Internet search engine, and wherein the query comprises at least the identification information associated with the network element and the error code associated with the error condition;
a network interface that outputs the query to an upstream server;
wherein the repair analysis module further:
retrieves repair analysis information from the upstream server; and
generates a user interface comprising the repair analysis information; and
a client interface that outputs the user interface for presentation at a display.

9. The diagnostics controller of claim 8, wherein the repair analysis module further:
receives a user instruction for taking an action to remedy the error condition; and
initiates the action identified by the user instruction.

10. The diagnostics controller of claim 8, wherein the repair analysis module further:
retrieves one or more query parameters associated with the network element, wherein the one or more query parameters comprise specific repair analysis information to be retrieved; and
includes a request for the specific repair analysis information in the query.

11. The diagnostics controller of claim 8, wherein the repair analysis information comprises troubleshooting information associated with the error condition.

12. The diagnostics controller of claim 8, wherein the repair analysis information comprises contact information for a repair source associated with the network element.

13. The diagnostics controller of claim 8, wherein the repair analysis information comprises an identification of a repair source associated with the network element.

14. One or more non-transitory computer readable media having instructions operable to cause one or more processors to perform the operations comprising:
detecting an error condition at a network element, wherein the error condition is detected by a diagnostics controller;
retrieving identification information associated with the network element;
retrieving an error code associated with the error condition;
generating a query, wherein the query comprises a query within an Internet search engine, and wherein the query comprises at least the identification information associated with the network element and the error code associated with the error condition, wherein the query is generated by the diagnostics controller;
outputting the query from the diagnostics controller to an upstream server;
retrieving repair analysis information from the upstream server;
generating a user interface comprising the repair analysis information; and
outputting the user interface for presentation at a display.

15. The one or more non-transitory computer-readable media of claim 14, wherein the instructions are further operable to cause the one or more processors to perform the operations comprising:
receiving a user instruction for taking an action to remedy the error condition; and
initiating the action identified by the user instruction.

16. The one or more non-transitory computer-readable media of claim 14, wherein the instructions are further operable to cause the one or more processors to perform the operations comprising:
retrieving one or more query parameters associated with the network element, wherein the one or more query parameters comprise specific repair analysis information to be retrieved; and
including a request for the specific repair analysis information in the query.

17. The one or more non-transitory computer-readable media of claim 14, wherein the repair analysis information comprises troubleshooting information associated with the error condition.

18. The one or more non-transitory computer-readable media of claim 14, wherein the repair analysis information comprises contact information for a repair source associated with the network element.

19. The one or more non-transitory computer-readable media of claim 14, wherein the repair analysis information comprises an identification of a repair source associated with the network element.

20. The one or more non-transitory computer-readable media of claim 19, wherein the instructions are further operable to cause the one or more processors to perform the operations comprising:
scheduling an appointment for repairing the network element at the repair source.

* * * * *